(12) United States Patent
Draper

(10) Patent No.: US 8,550,484 B1
(45) Date of Patent: Oct. 8, 2013

(54) ADJUSTABLE BICYCLE HANDLE BAR ADAPTER AND ASSOCIATED METHOD

(76) Inventor: Richard Draper, Beaconside (GB)

( * ) Notice: Subject to any disclaimer, the term of this patent is extended or adjusted under 35 U.S.C. 154(b) by 0 days.

(21) Appl. No.: 12/869,241

(22) Filed: Aug. 26, 2010

Related U.S. Application Data

(60) Provisional application No. 61/236,906, filed on Aug. 26, 2009.

(51) Int. Cl.
*B62K 21/16* (2006.01)
(52) U.S. Cl.
USPC ............ 280/280; 280/276; 280/278; 280/279
(58) Field of Classification Search
USPC .................................. 280/280, 276, 278, 279
See application file for complete search history.

(56) References Cited

U.S. PATENT DOCUMENTS

| | | | |
|---|---|---|---|
| 357,819 A | 2/1887 | Duryea | |
| 4,390,300 A | 6/1983 | Foster | |
| 5,181,436 A * | 1/1993 | Lai | 74/551.2 |
| 5,241,881 A * | 9/1993 | Chen | 74/551.2 |
| 5,327,798 A * | 7/1994 | Lerch, Jr. | 74/551.3 |
| 5,404,769 A * | 4/1995 | Kao | 74/551.3 |
| 5,509,328 A * | 4/1996 | Lai | 74/551.3 |
| 5,755,141 A * | 5/1998 | Chen | 74/551.3 |
| 5,846,042 A * | 12/1998 | Iannuzzi | 411/120 |
| 6,206,395 B1 * | 3/2001 | Young | 280/278 |
| 6,702,312 B1 * | 3/2004 | Miksik | 280/287 |
| 2005/0286968 A1 * | 12/2005 | Loebner | 403/109.1 |

* cited by examiner

*Primary Examiner* — Lesley D Morris
*Assistant Examiner* — Michael Stabley

(57) ABSTRACT

A bicycle headstock assembly may include a lower member adapted to be attached to a steering rod of the bicycle, and an upper member adjustably connected to the lower member. A pivot joint may be formed at a connection of the lower and upper members respectively. A handle bar clamp may be connected to the upper member and extending away therefrom. A primary fastener may pass through a first location of the pivot joint while an auxiliary fastener may pass through a second location of the pivot joint respectively. In this way, the primary and auxiliary fasteners may cooperate to permit the upper member to selectively pivot and lock at alternate positions relative to the lower member.

12 Claims, 9 Drawing Sheets

ADJUSTABLE BICYCLE HANDLE BAR ADAPTER AND ASSOCIATED METHOD

CROSS REFERENCE TO RELATED APPLICATIONS

This application claims the benefit of U.S. Provisional Application No. 61/236,906, filed Aug. 26, 2009, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to bicycle stems and, more particularly, to a bicycle headstock assembly for providing users with an effective means of easily adjusting the height and reach of a bicycle handlebars.

2. Prior Art

Ergonomically, all human beings are of differing physical geometry. When any person male or female purchases a "standard" bicycle of any make, the comfort fit due to the standard frame geometry and standard no/limited-adjustable components is a compromise due to the standard design of the bicycle.

The structural design of a conventional handlebar stem is based on human engineering. To suit physical characteristics of human bodies, different sizes of handlebar stems are manufactured to fit a variety of hand positions of users. Sizes of stems are distinguished by the distance between the rod and the binder clamp of the stem. Basically, the standard sizes based on the measurement are 115 mm, 135 mm and 155 mm (or 120 mm, 140 mm and 160 mm). Sizes of handlebar stems used by cyclists may change in relation to difference in age and body figure. Different requirements of consumers mean that bicycle manufacturers have to produce different sizes of stems to allow consumers to choose for different kinds of bicycle assemblies. However the size of the stems is fixed and cannot be adjusted. Therefore, manufacturers have to manufacture different stem sizes to meet customer needs. It creates huge inventories and increases molding costs. As a result, capital is tied down in inventory investment and cannot be directed for better use.

Accordingly, a need remains for an apparatus in order to overcome the above-noted shortcomings. The present invention satisfies such a need by providing a bicycle headstock assembly that is convenient and easy to use, is durable yet lightweight in design, is versatile in its applications, and provides users with an effective means of adjusting the height and reach to the handlebars during long rides to achieve maximum comfort.

BRIEF SUMMARY OF THE INVENTION

In view of the foregoing background, it is therefore an object of the present invention to provide an apparatus for adjusting a height and a reach of a handle bar of a bicycle. These and other objects, features, and advantages of the invention are provided by a bicycle headstock assembly.

The bicycle headstock assembly may include a lower member adapted to be attached to a steering rod of the bicycle, and an upper member adjustably connected to the lower member. A pivot joint may be formed at a connection of the lower and upper members respectively. A handle bar clamp may be connected to the upper member and extending away therefrom. A primary fastener may pass through a first location of the pivot joint while an auxiliary fastener may pass through a second location of the pivot joint respectively. In this way, the primary and auxiliary fasteners may cooperate to permit the upper member to selectively pivot and lock at alternate positions relative to the lower member. Such an arrangement provides the unexpected and unpredictable advantage of providing a multiple of height and reach adjustments of the bicycle handle bar vis-à-vis the rider's size. The pivot joint further allows the upper member to be angularly adjusted to suit a variety of different riding styles and comfort.

The pivot joint may include a plurality of first annular plates statically attached to a proximal end of the upper member and spaced apart at a fixed spatial distance. A plurality of second annular plates may further be statically attached to an upper end of the lower member and spaced apart at a fixed spatial distance respectively. The first annular plates may be rotatably interfitted between the second annular plates respectively such that the first and second annular plates are juxtaposed side-by-side in a parallel configuration. The first and second annular plates may further be co-axially aligned along a fulcrum axis of the pivot joint. Such an arrangement provides the unexpected and unpredictable advantage of enabling a strong grip between the lower and upper members by providing a bigger frictional area between the first and second annular plates respectively.

The first and second annular plates may be provided with a primary aperture formed at a center thereof and aligned along the fulcrum axis of the pivot joint. Each of the first and second annular plates may further be provided with a plurality of auxiliary apertures formed along a circumference thereof respectively, such that corresponding ones of the auxiliary apertures may be aligned along a plurality of linear paths registered parallel to the fulcrum axis of the pivot joint. In this way, the primary fastener may be removably interfitted through each of the primary apertures and thereby pivotally engages the upper member to the lower member respectively. The auxiliary fastener may further be removably interfitted through the corresponding auxiliary apertures and thereby statically engages the upper member to the lower member. In this way, removal of the auxiliary fastener from the pivot joint permits the upper member to selectively rotate relative to the lower member while removal of the primary and auxiliary fasteners from the pivot joint permits the upper member to disengage the lower member. Such an arrangement provides the unexpected and unpredictable advantage of adjusting the angular position of the upper member such that the handle bar may be adjusted higher and nearer to a rider or lower but further from a rider respectively to suit different body sizes and arm lengths without having to adjust the lengths of lower or upper members individually. One skilled in the art may appreciate that such an arrangement may provide the rider with an optimum position in which to ride with least body strain and discomfort.

The lower member may include a lower end preferably having an axial bore formed therein and a linear slot formed along an outer surface thereof and extending parallel to its longitudinal length. A collar clamp may be attached to the outer surface of the lower end and positioned at opposite side of the slot. Such a collar clamp may be selectively tightened and loosened for decreasing and increasing a width of the slot respectively. Such an arrangement provides the unexpected and unpredictable advantage of adjusting the height of the bicycle handle bar easily and conveniently by using only a single tool to fasten or loosen the collar clamp.

The handle bar clamp may include a first section preferably having a proximal end directly coupled to the upper member and axially aligned therewith. An arcuate stationary clamp head may be fixedly attached to a distal end of the first section. An arcuate mobile clamp head may be removably connected to the stationary clamp head and thereby adapted to be attached to the handle bars of the bicycle. Such an arrangement provides the unexpected and unpredictable advantage of attaching the handle bar of the bicycle or removing the apparatus quickly and easily by using only a single tool similar to that for the collar clamp.

The upper member may include a distal end preferably having an axial bore formed therein and slidably engaged with the handle bar clamp. A selectively adjustable upper member clamp may further secure the handle bar clamp to the upper member. Such an arrangement provides the unexpected and unpredictable advantage of adjusting the length of the upper member telescopically by using only a single tool to tighten or loosen the upper member clamp in a similar manner to that for the collar clamp. An alignment bar may further be positioned along the first section and upper member to align and prevent the handle bar clamp from loosening and rotating around a central axis of the upper member thereby displacing the bicycle handle bar from its horizontal alignment when in use.

The invention may include a method of utilizing a bicycle headstock assembly for adjusting a height and a reach of a handle bar of a bicycle. Such a method may include the chronological steps of: providing and attaching a lower member to a steering rod of the bicycle; providing and adjustably connecting an upper member to the lower member; forming a pivot joint connection of the lower and upper members; providing and connecting a handle bar clamp to the upper member such that the handle bar clamp extends away therefrom; providing and passing a primary fastener through a first location of the pivot joint; providing and passing an auxiliary fastener through a second location of the pivot joint; and providing for the primary fastener to be cooperating with the auxiliary fastener and thereby permitting the upper member to selectively pivot and lock at alternate positions relative to the lower member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
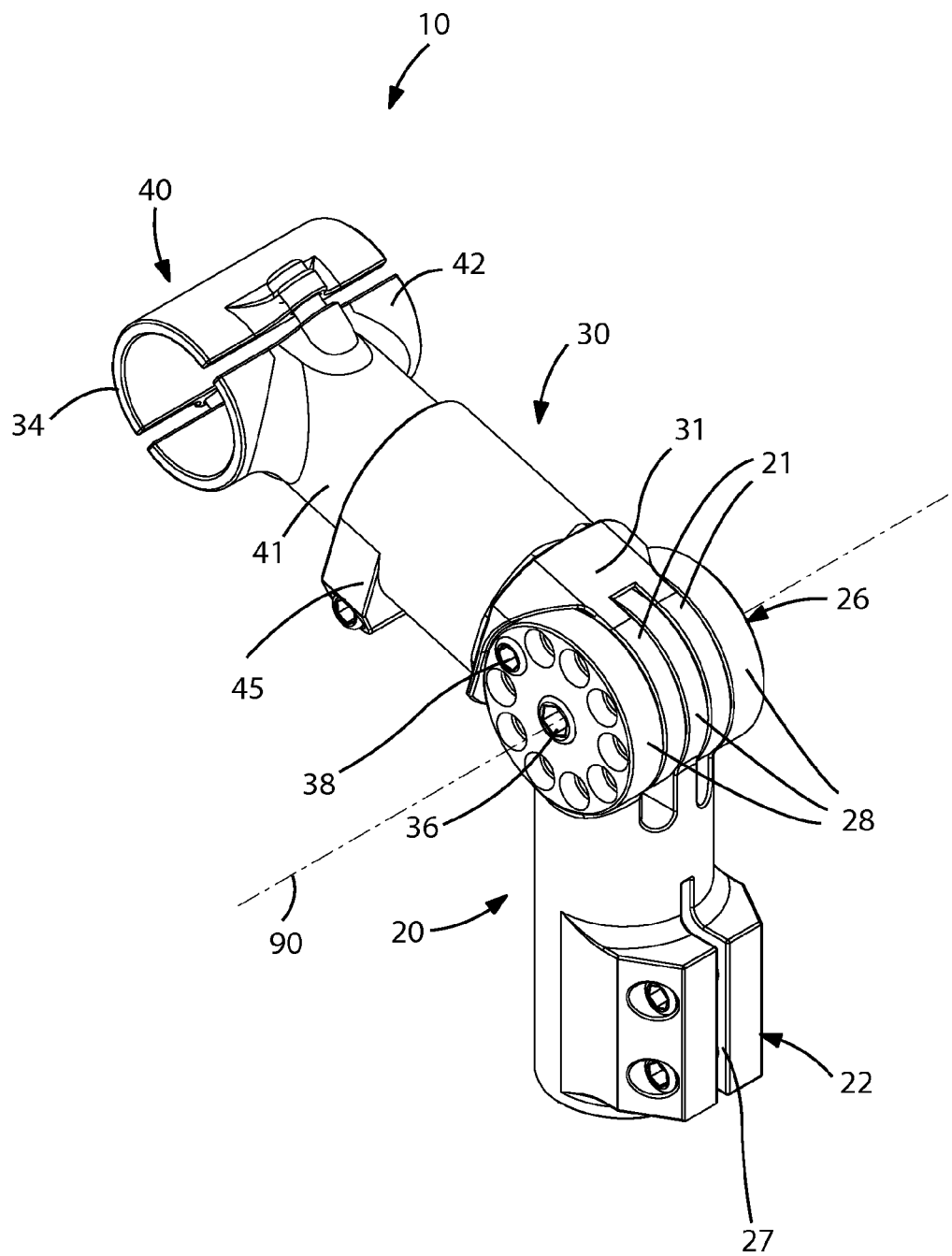
FIG. 1 is a perspective view showing a bicycle headstock assembly showing the upper member in a raised orientation, in accordance with the present invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The invention aims to provide a solution to the problem of obtaining a "best fit" or best possible comfort position for the use by allowing the adjustment of the angle of the stem thus controlling the height and reach to the handlebars combined in the same apparatus so that the user is neither under or over reaching to the handlebars and at the same time the handle bars are not too high nor too low for them to rest on and steer comfortably. The effects of carpal tunnel syndrome are well known by cyclists due to the wrong position leading to that pins and needles feeling in the wrists and hands. This invention aims to significantly reduce or eliminate that problem. Better comfort will lead to safer cyclists as well, as they will have better control of their bicycle for longer periods.

The apparatus 10 would benefit many cyclists in that it allows them to adjust the height and reach of the handlebars to make the riding experience more comfortable. Also, the apparatus 10 would allow users that are outside of the average size range to purchase a bicycle and customize it to be comfortable for them to ride.

The apparatus of this invention is referred to generally in the FIGS. 1-13 and is intended to provide an adjustable bicycle stem. It should be understood that the present invention may be used to adjust the height and reach of the handlebars of many different types of sport bikes, racing bikes, mountain bikes and the like, and should not be limited to the uses described herein.

Referring generally to FIGS. 1-13, the bicycle headstock assembly 10 may include a lower member 20 adapted to be attached to a steering rod of the bicycle, and an upper member 30 adjustably connected to the lower member 20. A pivot joint 26 may be formed at a connection of the lower and upper members 20, 30 respectively. A handle bar clamp 40 may be connected to the upper member 30 and extend away therefrom. As shown in FIG. 3, a primary fastener 36 may pass through a first location of the pivot joint 26 while an auxiliary fastener 38 may pass through a second location of the pivot joint 26 respectively. In this way, the primary and auxiliary fasteners 36, 38 advantageously cooperate to permit the upper member 30 to selectively pivot and lock at alternate positions relative to the lower member 20. Such an arrangement provides the unexpected and unpredictable advantage of providing a variety of incremental adjustment to the height and reach position of the bicycle handle bar without having to completely disengage the upper and lower members 20, 30. The pivot joint 26 further allows the upper member 30 to be angularly adjusted to suit a variety of different riding styles and comfort. By employing both fasteners 36, 38, improved strength is also achieved at the pivot joint 26. Such a pivot joint 36, 38 may be substantially similar to a VERNIER clamp, for example.

Figure 2:
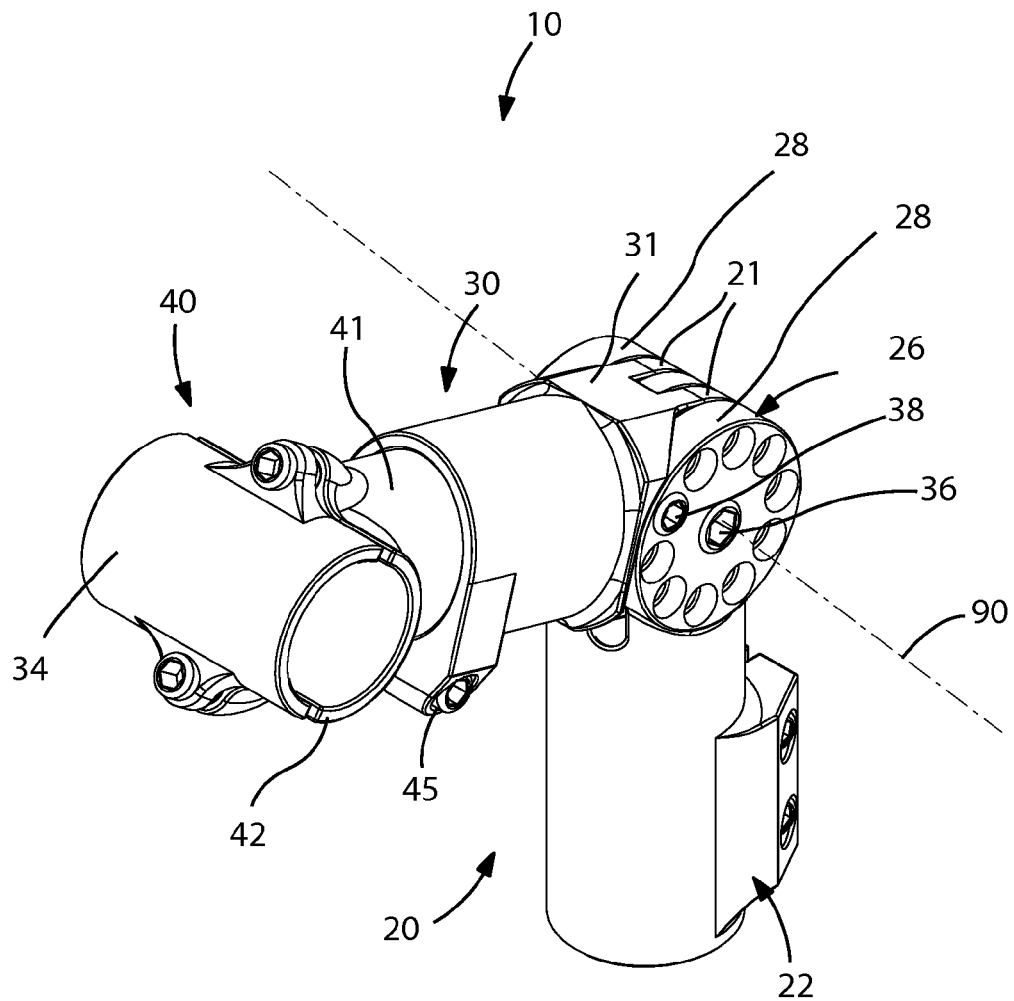
FIG. 2 is another perspective view of the apparatus showing the upper member in a lowered down orientation.
Figure 3:
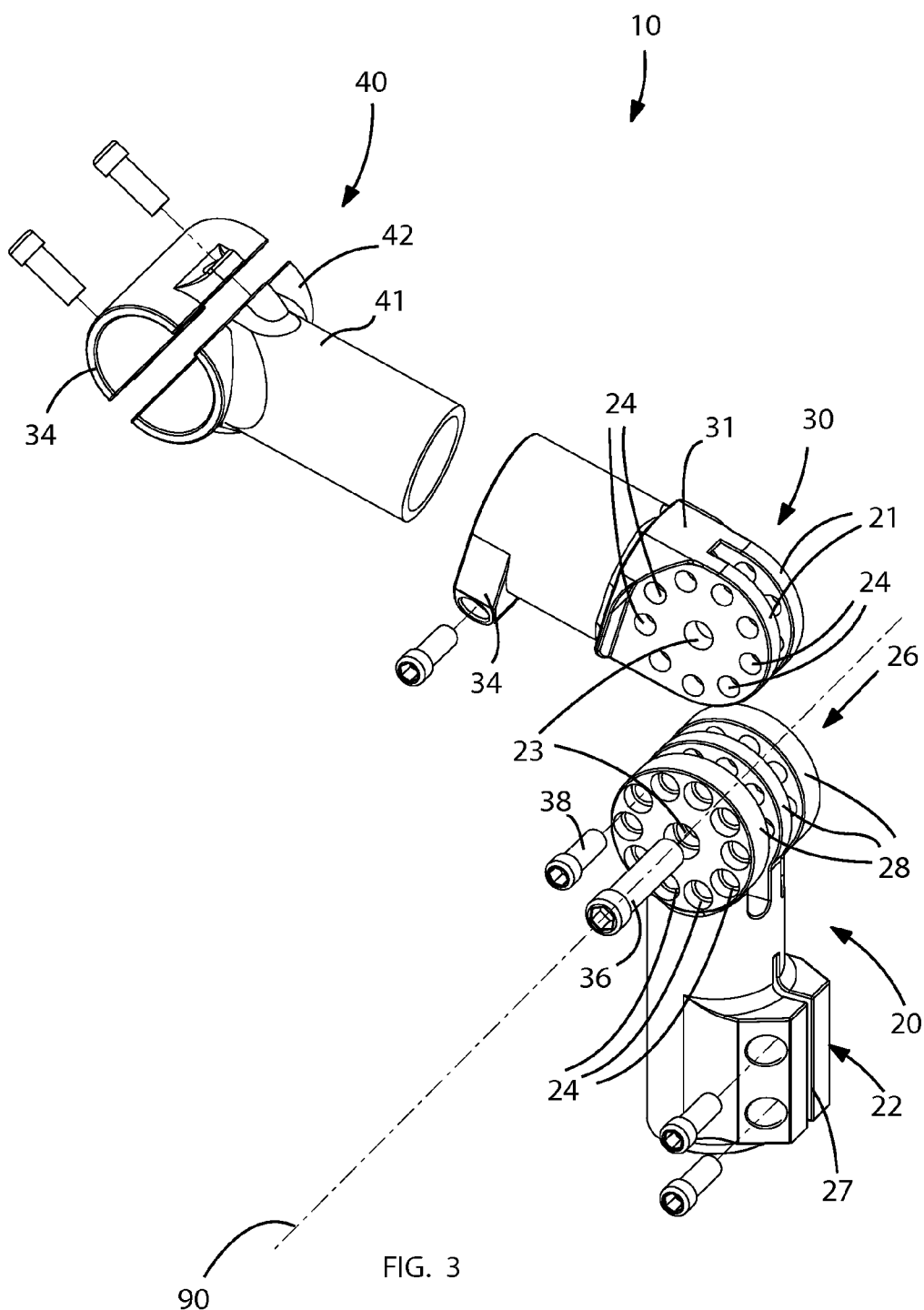
FIG. 3 is an exploded view of the apparatus shown in FIG. 1.
Figure 4:
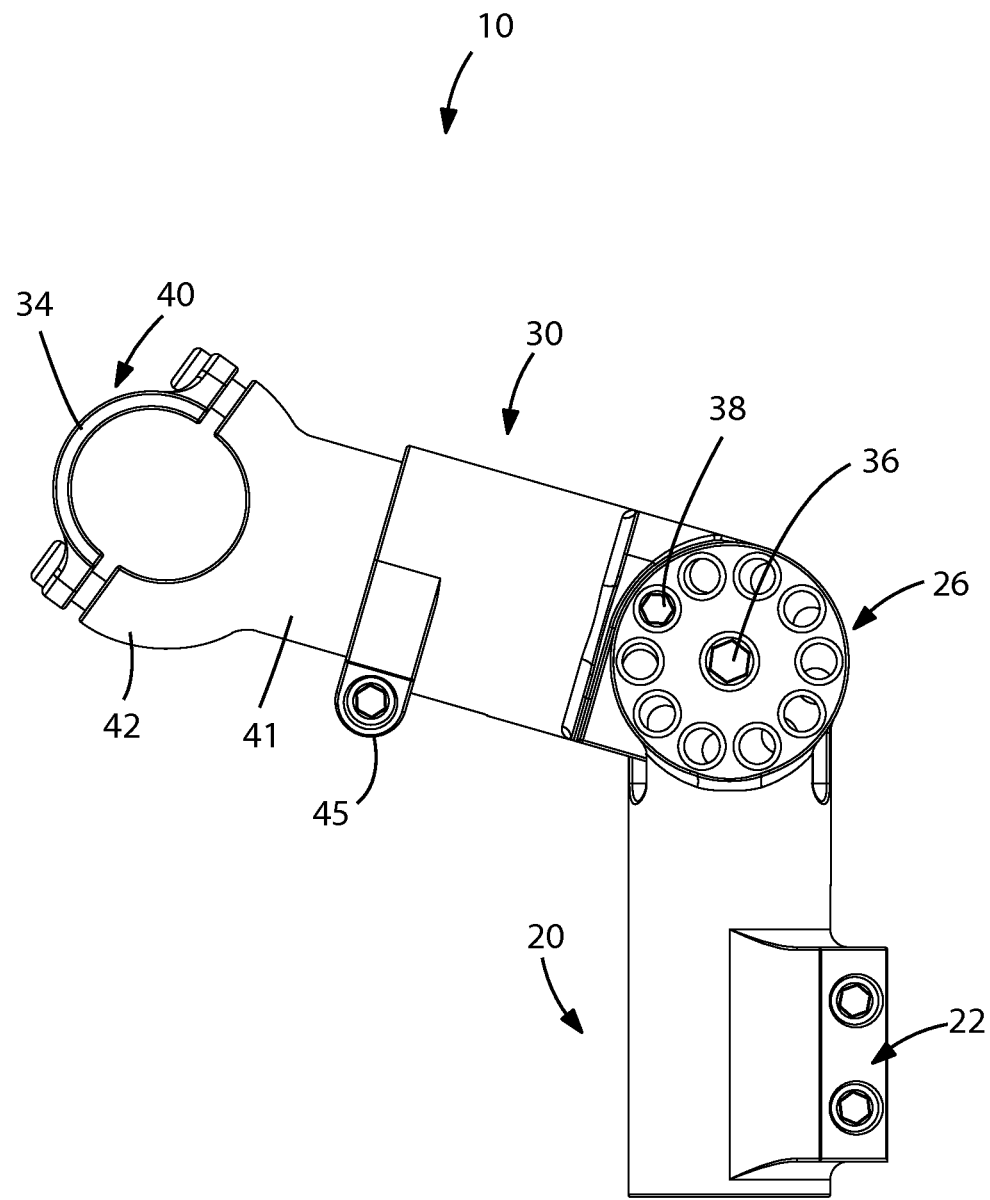
FIG. 4 is a side elevational view of the apparatus shown in FIG. 1.
Figure 5:
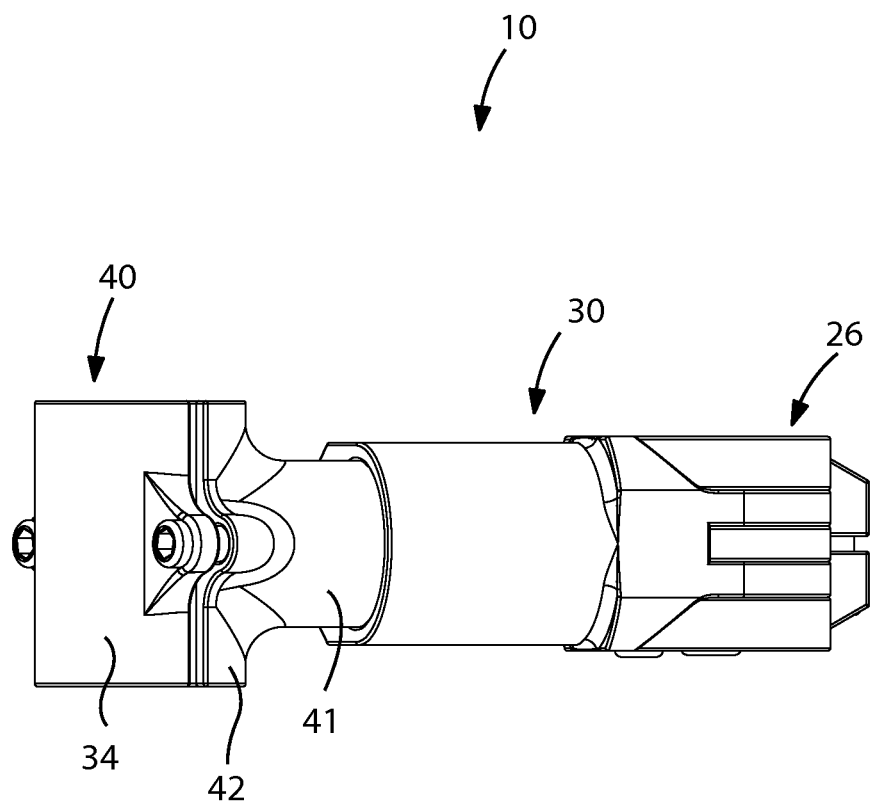
FIG. 5 is a top plan view of the apparatus shown in FIG. 1.

Referring to FIGS. 1-3, the pivot joint 26 may include a plurality of first annular plates 21 statically attached to a proximal end 31 of the upper member 30 and spaced apart at a fixed spatial distance. A plurality of second annular plates 28 may further be statically attached to an upper end of the lower member 20 and spaced apart at a fixed spatial distance respectively. The first annular plates 21 may be rotatably interfitted between the second annular plates 28 respectively such that the first and second annular plates 21, 28 are juxtaposed side-by-side in a parallel configuration. As shown in FIGS. 1-2, the first and second annular plates 21, 28 may further be co-axially aligned along a fulcrum axis 90 of the pivot joint 26. Such an arrangement provides the unexpected and unpredictable advantage of enabling a strong grip between the lower and upper members 20, 30 by providing a larger frictional surface area contact between the first and second annular plates 21, 28 respectively.

Referring now to FIG. 3, the first and second annular plates 21, 28 may be provided with a primary aperture 23 formed at a center thereof and aligned along the fulcrum axis 90 of the pivot joint 26. Each of the first and second annular plates 21, 28 may further be provided with a plurality of auxiliary apertures 24 formed along a circumference thereof, respectively, such that corresponding ones of the auxiliary apertures 24 may be aligned along a plurality of linear paths registered parallel to the fulcrum axis 90 of the pivot joint 26. In this way, the primary fastener 36 may be removably interfitted through each of the primary apertures 23 and thereby pivotally engages the upper member 30 to the lower member 20 respectively. Such a structural configuration provides the unpredicted and unexpected advantage of permitting the user to selectively articulate the upper member 30 relative to the lower member 20 while the primary fastener 36 is interfitted thereto.

The auxiliary fastener 38 may further be removably interfitted through corresponding auxiliary apertures 24 and thereby statically engages the upper member 30 to the lower member 20. In this way, removal of the auxiliary fastener 38 from the pivot joint 26 permits the upper member 30 to selectively rotate relative to the lower member 20 while, removal of the primary and auxiliary fasteners 36, 38 from the pivot joint 26, permits the upper member 30 to disengage the lower member 20. Such an arrangement provides the unexpected and unpredictable advantage of incrementally adjusting the angular position of the upper member 30 at predetermined positions such that the bicycle handle bar may be adjusted higher and nearer to a rider or lower but further from a rider respectively to suit different body sizes and arm lengths without having to individually adjust the lengths of lower or upper members 20, 30. Such an arrangement provides the rider with a simple and effective mechanism to selectively position the handle bar along at equally spaced intervals.

Figure 6:
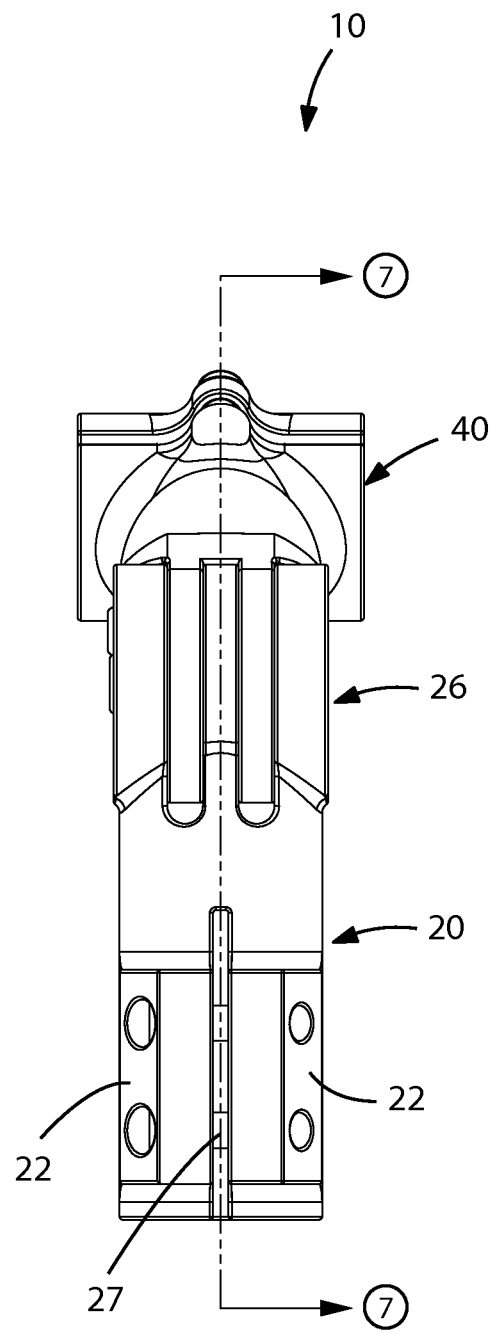
FIG. 6 is a rear elevational view of the apparatus shown in FIG. 1.
Figure 7:
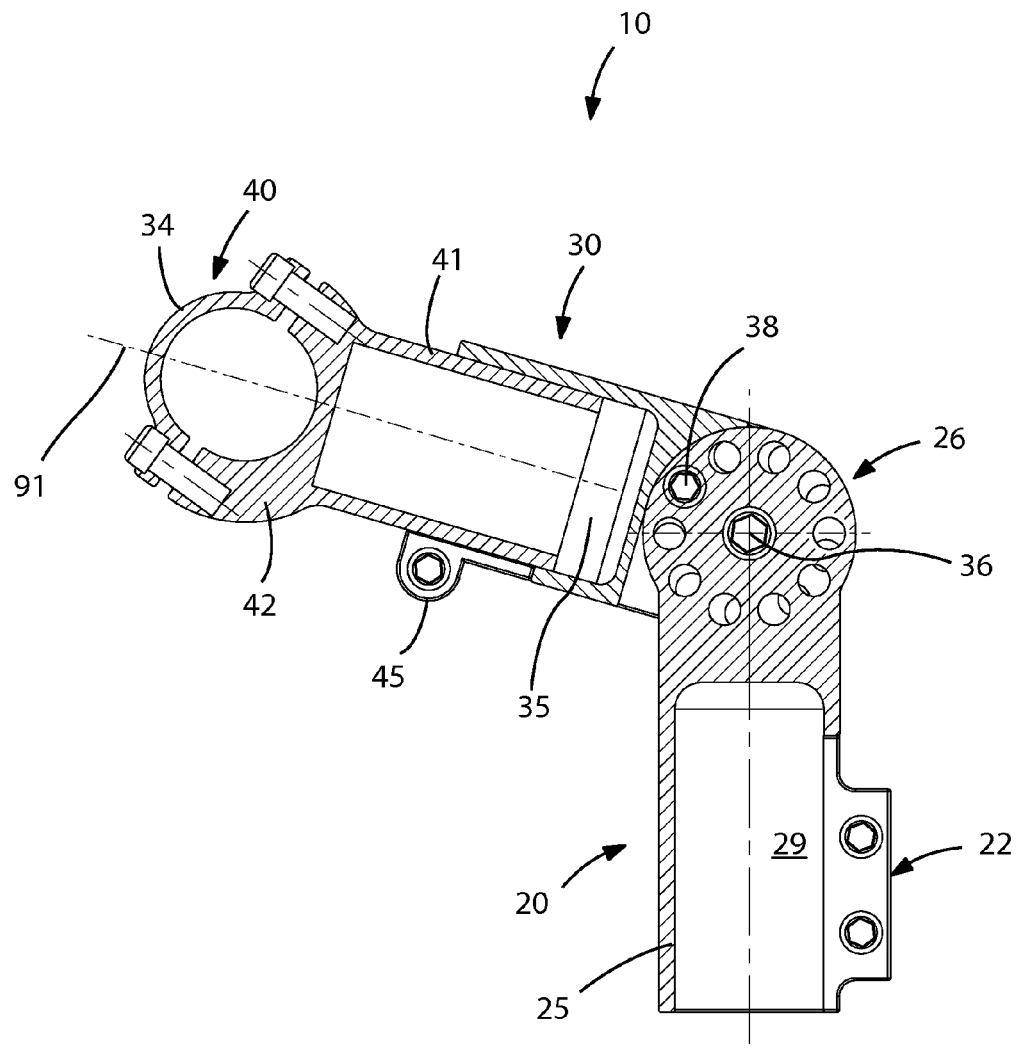
FIG. 7 is a cross-sectional view of the apparatus along line 7-7 shown in FIG. 6.
Figure 8:
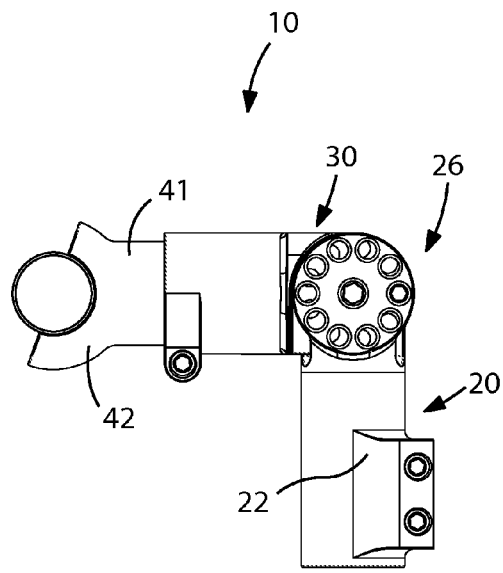
FIG. 8 is a side elevational view of the apparatus with the upper member in a horizontal orientation.
Figure 9:
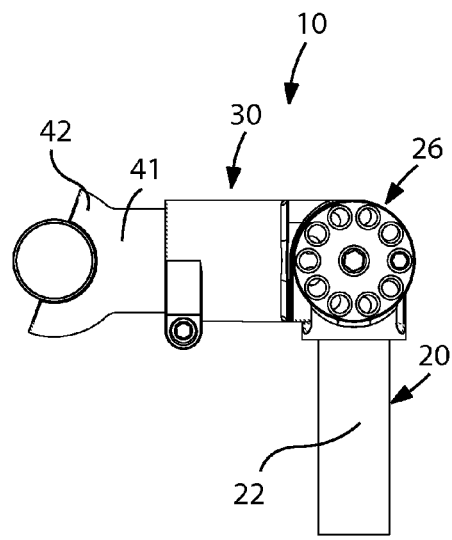
FIG. 9 is a side elevational view of the apparatus with the upper member in a horizontal orientation and the lower member removed.
Figure 10:
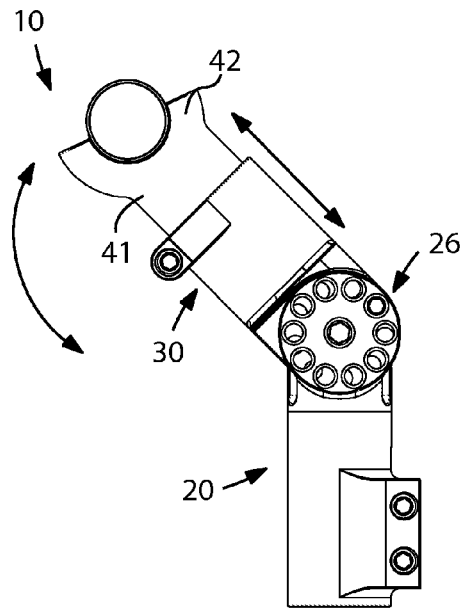
FIG. 10 is a side elevational view of the apparatus showing the telescoping action of the upper member in a raised orientation.
Figure 11:
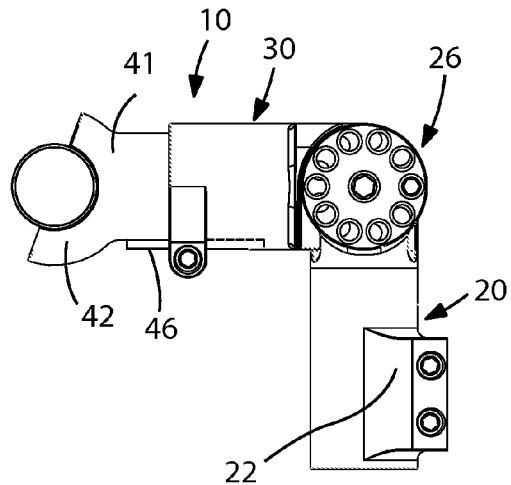
FIG. 11 is a side elevational view of the apparatus with the upper member in a horizontal orientation with the reinforcement bar attached.
Figure 12:
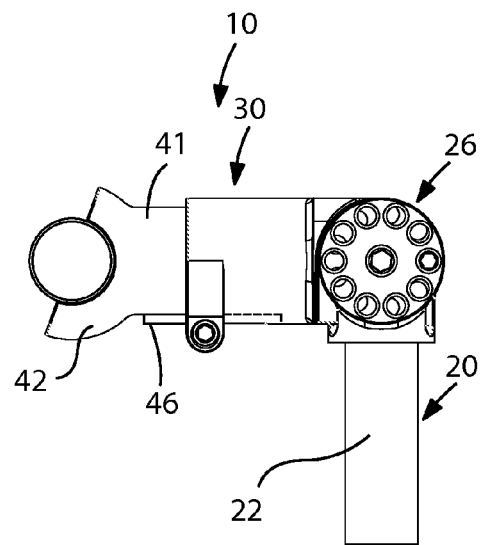
FIG. 12 is a side elevational view of the apparatus with the upper member in a horizontal orientation with the reinforcement bar attached and the lower member removed.
Figure 13:
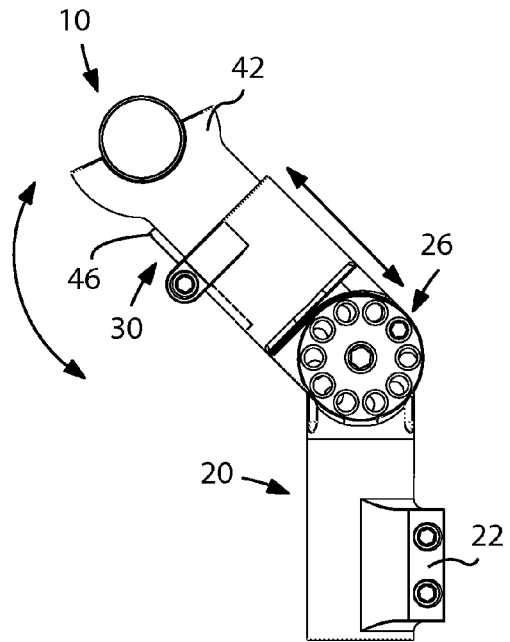
FIG. 13 is a side elevational view of the apparatus showing the telescoping action of the upper member in a raised orientation with the reinforcement bar attached.

Referring now to FIGS. 6-7, the lower member 20 may include a lower end 25 preferably having an axial bore 29 formed therein and a linear slot 27 formed along an outer surface thereof and extending parallel to its longitudinal length. A collar clamp 22 may be attached to the outer surface of the lower end 25 and positioned at opposite side of the slot 27. Such a collar clamp 22 may be selectively tightened and loosened for decreasing and increasing a width of the slot respectively. Such an arrangement provides the unexpected and unpredictable advantage of adjusting the height of the bicycle handle bar easily and conveniently by using only a single tool to fasten or loosen the collar clamp 22.

Referring again to FIGS. 1-3, the handle bar clamp 40 may include a first section 41 preferably having a proximal end directly coupled to the upper member 30 and axially aligned therewith. An arcuate stationary clamp head 42 may be fixedly attached to a distal end of the first section 41. An arcuate mobile clamp head 34 may be removably connected to the stationary clamp head 42 and thereby adapted to be attached to the handle bars of the bicycle. Such an arrangement provides the unexpected and unpredictable advantage of quickly and easily attaching and removing the handle bar of the bicycle by using only a single tool similar to that for the collar clamp 22.

As shown in FIG. 7, the upper member 30 may include a distal end preferably having an axial bore 35 formed therein and slidably engaged with the handle bar clamp 40. A selectively adjustable upper member clamp 45 may further secure the handle bar clamp 40 to the upper member 30. Such an arrangement provides the unexpected and unpredictable advantage of telescopically adjusting the length of the upper member 30 by using only a single tool to tighten or loosen the upper member clamp 45 in a similar manner to that for the collar clamp 22. Referring to FIGS. 7 and 11-13, an alignment bar 46 may further be positioned along the first section 41 and upper member 30 to align and prevent the handle bar clamp 40 from loosening and rotating around a central axis 91 of the upper member 30 thereby displacing the bicycle handle bar from its horizontal alignment when in use.

The invention may further include a method of utilizing a bicycle headstock assembly 10 for adjusting a height and a reach of a handle bar of a bicycle. Such a method may include the chronological steps of: providing and attaching a lower member 20 to a steering rod of the bicycle; providing and adjustably connecting an upper member 30 to the lower member 20; forming a pivot joint 26 connection of the lower and upper members 20, 30; providing and connecting a handle bar clamp 40 to the upper member 30 such that the handle bar clamp 40 extends away therefrom; providing and passing a primary fastener 36 through a first location of the pivot joint 26; providing and passing an auxiliary fastener 38 through a second location of the pivot joint 26; and the primary fastener 36 cooperating with the auxiliary fastener 38 and thereby permitting the upper member 30 to selectively pivot and lock at alternate positions relative to the lower member 20.

The lower member 20; the handle bar clamp 40 and the upper member 30 and the pivot joint 26 may form an adjustably rigid mechanism to adjust the height and reach to ergonomically suit a cyclist. The auxiliary fastener 38 and primary fastener 36, collar clamp 22, and the handle bar clamp 40 cooperate to prevent premature or undesirable slippage of the apparatus 10 by holding together the pivot joint 26 in a locked position.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the present invention may include variations in size, materials, shape, form, function and manner of operation.

What is claimed as new and what is desired to secure by Letters Patent of the United States is:

1. A bicycle headstock assembly for adjusting a height and a reach of a handle bar of a bicycle, said bicycle headstock assembly comprising:

a lower member adapted to be attached to a steering rod of the bicycle;

an upper member connected to said lower member;

a pivot joint formed at a connection of said lower and upper members;

a handle bar clamp connected to said upper member;

a primary fastener passed through a first location of said pivot joint; and an auxiliary fastener passed through a second location of said pivot joint;

wherein said primary and auxiliary fasteners cooperate to permit said upper member to selectively pivot and lock at alternate positions relative to said lower member;

wherein said pivot joint comprises:

a plurality of first annular plates statically attached to a proximal end of said upper member, said first annular plates being spaced apart at a fixed spatial distance; and a plurality of second annular plates statically attached to an upper end of said lower member, said second annular plates being spaced apart at a fixed spatial distance respectively;

wherein said first annular plates are rotatably interfitted between said second annular plates respectively such that said first and second annular plates are juxtaposed side-by-side in a parallel configuration;

wherein said first and second annular plates are co-axially aligned along a fulcrum axis of said pivot joint.

2. The bicycle headstock assembly of claim 1, wherein each of said first and second annular plates is provided with a primary aperture formed at a center thereof, said primary apertures being aligned along the fulcrum axis of said pivot joint;

wherein each of said first and second annular plates is provided with a plurality of auxiliary apertures formed along a circumference thereof respectively, corresponding ones of said auxiliary apertures being aligned along a plurality of linear paths registered parallel to the fulcrum axis of said pivot joint;

wherein said primary fastener is removably interfitted through each of said primary apertures and thereby pivotally engages said upper member to said lower member;

wherein said auxiliary fastener is removably interfitted through said corresponding auxiliary apertures and thereby statically engages said upper member to said lower member.

3. The bicycle headstock assembly of claim 1, wherein removal of said auxiliary fastener from said pivot joint permits said upper member to selectively rotate relative to said lower member;
    wherein removal of said primary and auxiliary fasteners from said pivot joint permits said upper member to disengage said lower member.

4. The bicycle headstock assembly of claim 1, wherein said lower member comprises:
    a lower end having an axial bore formed therein, said lower end further having a linear slot formed along an outer surface thereof and extending parallel to a longitudinal length of said lower member; and
    a collar clamp attached to said outer surface of said lower end and positioned at opposite side of said slot;
    wherein said collar clamp is selectively tightened and loosened for decreasing and increasing a width of said slot respectively.

5. The bicycle headstock assembly of claim 1, wherein said handle bar clamp comprises:
    a first section having a proximal end directly coupled to said upper member and axially aligned therewith; and
    an arcuate stationary clamp head fixedly attached to a distal end of said first section;
    an arcuate mobile clamp head removably connected to said stationary clamp head and thereby adapted to be attached to the handle bars of the bicycle.

6. The bicycle headstock assembly of claim 1, wherein said upper member comprises:
    a distal end having an axial bore formed therein and slidably engaged with said handle bar clamp; and
    a selectively adjustable upper member clamp securing said handle bar clamp to said upper member.

7. A bicycle headstock assembly for adjusting a height and a reach of a handle bar of a bicycle, said bicycle headstock assembly comprising:
    a lower member adapted to be attached to a steering rod of the bicycle;
    an upper member adjustably connected to said lower member;
    a pivot joint formed at a connection of said lower and upper members;
    a handle bar clamp connected to said upper member and extending away therefrom;
    a primary fastener passed through a first location of said pivot joint; and
    an auxiliary fastener passed through a second location of said pivot joint;
    wherein said primary and auxiliary fasteners cooperate to permit said upper member to selectively pivot and lock at alternate positions relative to said lower member;
    wherein said pivot joint comprises:
    a plurality of first annular plates statically attached to a proximal end of said upper member, said first annular plates being spaced apart at a fixed spatial distance; and
    a plurality of second annular plates statically attached to an upper end of said lower member, said second annular plates being spaced apart at a fixed spatial distance respectively;
    wherein said first annular plates are rotatably interfitted between said second annular plates respectively such that said first and second annular plates are juxtaposed side-by-side in a parallel configuration;
    wherein said first and second annular plates are co-axially aligned along a fulcrum axis of said pivot joint.

8. The bicycle headstock assembly of claim 7, wherein each of said first and second annular plates is provided with a primary aperture formed at a center thereof, said primary apertures being aligned along the fulcrum axis of said pivot joint;
    wherein each of said first and second annular plates is provided with a plurality of auxiliary apertures formed along a circumference thereof respectively, corresponding ones of said auxiliary apertures being aligned along a plurality of linear paths registered parallel to the fulcrum axis of said pivot joint;
    wherein said primary fastener is removably interfitted through each of said primary apertures and thereby pivotally engages said upper member to said lower member;
    wherein said auxiliary fastener is removably interfitted through said corresponding auxiliary apertures and thereby statically engages said upper member to said lower member.

9. The bicycle headstock assembly of claim 7, wherein removal of said auxiliary fastener from said pivot joint permits said upper member to selectively rotate relative to said lower member;
    wherein removal of said primary and auxiliary fasteners from said pivot joint permits said upper member to disengage said lower member.

10. The bicycle headstock assembly of claim 7, wherein said lower member comprises:
    a lower end having an axial bore formed therein, said lower end further having a linear slot formed along an outer surface thereof and extending parallel to a longitudinal length of said lower member; and
    a collar clamp attached to said outer surface of said lower end and positioned at opposite side of said slot;
    wherein said collar clamp is selectively tightened and loosened for decreasing and increasing a width of said slot respectively.

11. The bicycle headstock assembly of claim 7, wherein said handle bar clamp comprises:
    a first section having a proximal end directly coupled to said upper member and axially aligned therewith; and
    an arcuate stationary clamp head fixedly attached to a distal end of said first section;
    an arcuate mobile clamp head removably connected to said stationary clamp head and thereby adapted to be attached to the handle bars of the bicycle.

12. The bicycle headstock assembly of claim 7, wherein said upper member comprises:
    a distal end having an axial bore formed therein and slidably engaged with said handle bar clamp; and
    a selectively adjustable upper member clamp securing said handle bar clamp to said upper member.

\* \* \* \* \*